United States Patent

Klare et al.

Patent Number: 6,085,720
Date of Patent: Jul. 11, 2000

[54] PROCESS FOR CONTROLLING AN INJECTION VALVE IN A FAST-RUNNING FUEL-INJECTION TWO-STROKE INTERNAL COMBUSTION ENGINE AND DEVICE FOR IMPLEMENTING IT

[75] Inventors: Hartmut Klare, Benshausen; Klaus Loeffler, Thalheim; Peter Schulz, Pleissa; Uwe Mehlhose, Chemnitz; Jan Lukomski, Rostock; Klaus Matthees, Freiberg; Jochen Schoenhaar, Hamburg; Andreas Singer, Fraureuth, all of Germany

[73] Assignee: Dolmar GmbH, Hamburg, Germany

[21] Appl. No.: 09/142,149

[22] PCT Filed: Mar. 17, 1997

[86] PCT No.: PCT/EP97/01316

§ 371 Date: Sep. 2, 1998

§ 102(e) Date: Sep. 2, 1998

[87] PCT Pub. No.: WO97/36098

PCT Pub. Date: Oct. 2, 1997

[30] Foreign Application Priority Data

Mar. 22, 1996 [DE] Germany .................... 196 11 289

[51] Int. Cl.⁷ .............. F02B 5/00; F02B 33/04; F02M 45/00; F02D 41/34
[52] U.S. Cl. ............................ 123/305; 123/73 C
[58] Field of Search ................ 123/73 C, 295, 123/305, 476

[56] References Cited

U.S. PATENT DOCUMENTS

| | | | |
|---|---|---|---|
| 4,949,689 | 8/1990 | Schlunke | 123/73 C |
| 5,081,975 | 1/1992 | Maebashi | 123/493 |
| 5,097,811 | 3/1992 | Baumuller | 123/73 C |
| 5,205,254 | 4/1993 | Ito et al. | 123/73 C |
| 5,333,583 | 8/1994 | Matsuura | 123/305 |
| 5,720,254 | 2/1998 | Yoshida et al. | 123/305 |
| 5,875,756 | 3/1999 | Kamura et al. | 123/305 |
| 5,911,206 | 6/1999 | Bylsma | 123/305 |

FOREIGN PATENT DOCUMENTS

| | | | |
|---|---|---|---|
| 0 261 473 A1 | 3/1988 | European Pat. Off. | F02D 41/26 |
| 0 683 310 A2 | 11/1995 | European Pat. Off. | F02D 41/34 |
| 39 26 322 A1 | 2/1990 | Germany | F02D 41/34 |
| 40 12 491 A1 | 10/1990 | Germany | F02D 3/00 |
| 2 232 273 | 12/1990 | United Kingdom | F02D 41/34 |
| 2 255 374 | 11/1992 | United Kingdom | F02D 41/40 |

*Primary Examiner*—Willis R. Wolfe
*Attorney, Agent, or Firm*—McCormick, Paulding & Huber LLP

[57] ABSTRACT

In a method for controlling an injection valve (16) in a high-speed internal combustion engine with fuel injection, in which method, with each revolution of the engine, at a trigger point (TP1,TP2), a trigger signal is generated and according to the trigger signal, the injection operation is initiated, in which, for low engine speeds, the injection start is within a first range (ESB1) of the crankshaft angle of rotation and in which, for high engine speeds, the injection start is within a second range (ESB2) of the crankshaft angle of rotation, which second range (ESB2) in comparison with the first range (ESB1), is displaced in the direction "early" relative to the top dead center (OT), an optimal operating behavior is achieved in that, to each of the two ranges (ESB1 or ESB2), a trigger point of its own (TP1 or TP2) is allocated and in that, when changing between low and high engine speeds, starting from a predetermined threshold engine speed, a changeover of the control between the two trigger points (TP1,TP2) takes place.

9 Claims, 2 Drawing Sheets

PROCESS FOR CONTROLLING AN INJECTION VALVE IN A FAST-RUNNING FUEL-INJECTION TWO-STROKE INTERNAL COMBUSTION ENGINE AND DEVICE FOR IMPLEMENTING IT

SCOPE OF APPLICATION

The invention relates to a method for controlling an injection valve in a high-speed two-stroke internal combustion engine with fuel injection.

In addition, the invention relates to a device for the performance of such a method.

STATE OF THE ART

Whereas four-stroke engines in general, over the entire engine speed and load range, possess a relatively uniform running of the engine, two-stroke engines show significant differences between the engine speed ranges (idling) and "operative range". When idling (low engine speed), a considerable rough running takes place which always calls for an exact injection. When starting from a certain trigger signal, a computation of the injection start is effected, the same has to take place in the immediate proximity of the trigger signal since otherwise significant errors with regard to the desired injection start may occur. These—as already mentioned—depend substantially on the degree of uniformity of the running of the engine and may differ considerably from revolution to revolution so that the running of the engine becomes uncontrollable. That is why the injection has to take place close to the trigger point or trigger signal.

As is illustrated in the FIG. 1 in an angle diagram of the engine crankshaft (KW) relative to the top dead center (OT), for low engine speeds, the injection starts (ESB) in dependence upon the respective engine configuration, are within a first (hatched) range (ESB1) between 180 and 240° KW (angles W4 and W3) before the top dead center (OT) of the engine. At higher engine speeds (several revs/min), all other injection starts, according to the respective load states, are necessary. Usually a displacement of the injection start in the direction of "early" within a second (hatched) range (ESB2) is necessary that is located between 270 and 350° KW (angles W2 and W1) before the top dead center.

For low engine speeds (e.g. when idling), according to the foregoing explanations it is expedient and advantageous to place the trigger point at which the trigger signal is generated close to the beginning of the first range (ESB1), thus e.g. at the point identified with (TP) in FIG. 1. In this way only a short angular distance exists between (TP) and the beginning of the injection range (W3). If, with increasing numebrs of revolutions, the injection start is brought forward from the range (ESB1) into the range (ESB2), in such a case also the trigger point (TP) ought to be correspondingly brought forward. A (virtual) displacement of the trigger point is expediently carried out in that the computation of the injection start for the next revolution is effected (long arrow from TP via the angles W5 and W6 of the ignition range ZB after W1 in FIG. 1). On account of the requisitite computation time as wella s on account of the time required for controlling the opening time of the injection valve, it may happen in dependence of the required injection start, that the trigger signal (e.g. from a Hall transmitter) employed for the idling range cannot be evaluated. The injection for the next revolution would not be possible or only subject to serious flaws.

TECHNICAL PROBLEM, SOLUTION, ADVANTAGES

The technical problem of the invention is now to state a method for controlling a high-speed two-stroke engine, which overcomes these disadvantages and ensures for each revolution of the engine in dependence upon load and speed an optimal injection start in connection with the requisite duration of the injection.

The technical problem is resolved in a method of the type stated in the beginning in that, to each of the two ranges, a trigger point of its own is allocated and in that, when changing over between low and high engine speeds, starting from a predetermined threshold number of revolutions, a changeover of the control takes place between the two trigger points. In this manner it is possible, when changing over to higher engine speeds and, thereby, to a brought-forward injection start, to switch over to a new trigger point optimally adapted to the injection start so that, even at higher revs/min, a perfect and optimized control of the injection start is possible.

A first preferred embodiment of the method according to the invention is distinguished in that the two trigger points are in each case located within a trigger range which, in relation to the crankshaft angle of rotation, is close to the associated injection range. The effects of engine speed fluctuations on the injection control are limited to a minimum hereby.

It has turned out to be especially advantageous if, according to a further development of this embodiment, the first range of approximately 180–240° KW is located before the top dead center (OT) of the engine, the second range within approximately 270°–350° KW before the top dead center, the first trigger range (within approximately 180 through 270° KW before the top dead center and the second trigger tange is within approximately 10–150° KW before the upper dead center.

A further preferred embodiment of the method according to the invention is characterized in that the ignition of the engine is effected with the aid of an ignition magneto of more than 10° KW, more particularly approximately 20° KW, before the top dead center, and in that the ignition signal emitted by the magneto is used as trigger signal for the second injection range. An overlapping of computation time, injection duration and trigger point is avoided with certainty.

The device for performing the method according to the invention is characterized in that the device comprises a control section which, by means of a change-over switch controlled by the control section is optionally connectable to one of the two trigger signal transmitters and in that an output of the control section is operatively connected with the injection valve.

Further embodiments result from the dependent claims.

BRIEF DESCRIPTION OF THE DRAWINGS

In the following the invention will be explained in greater detail with the aid of embodiment examples in connection with the drawings. Thus

DETAILED DESCRIPTION OF THE INVENTION AND BEST WAY OF REALIZING THE INVENTION

Figure 1:
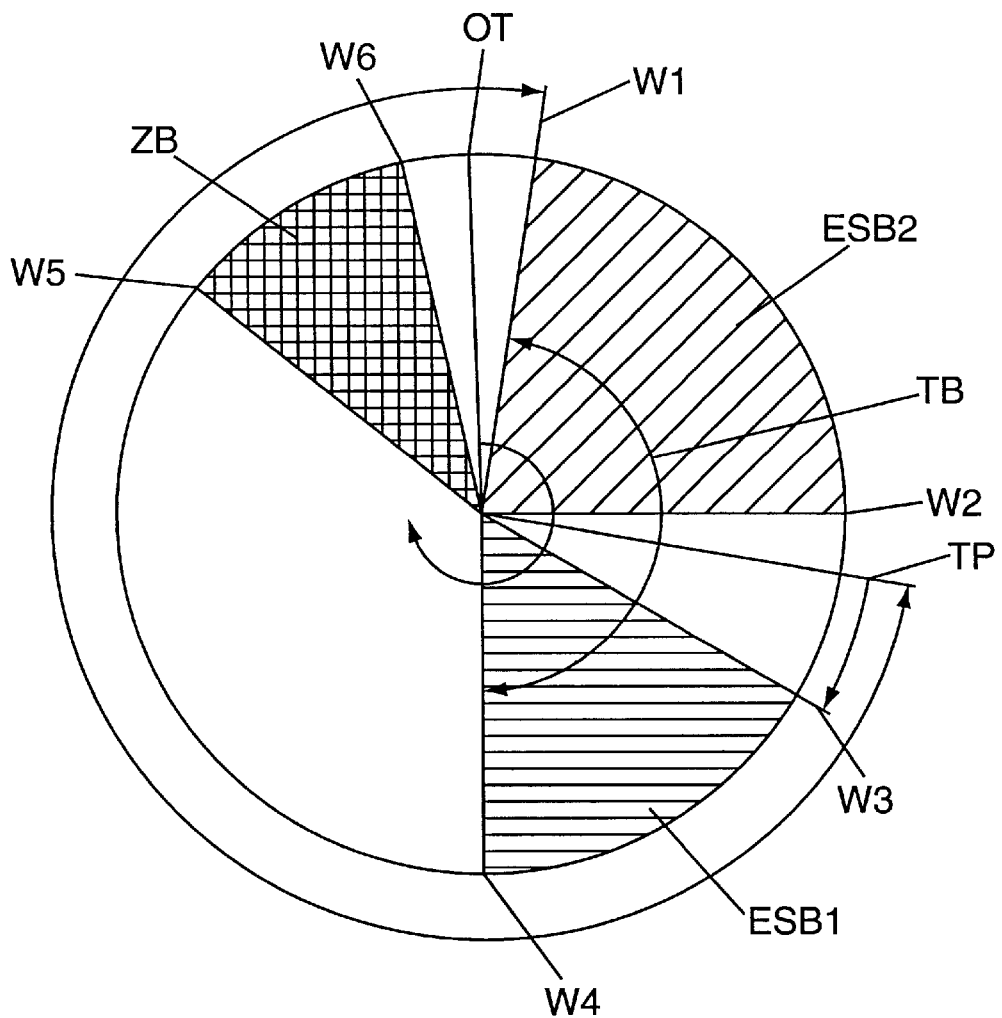
FIG. 1 shows an angle diagram related to the crankshaft rotation with the control angle for a conventional injection control with a trigger point.
Figure 2:
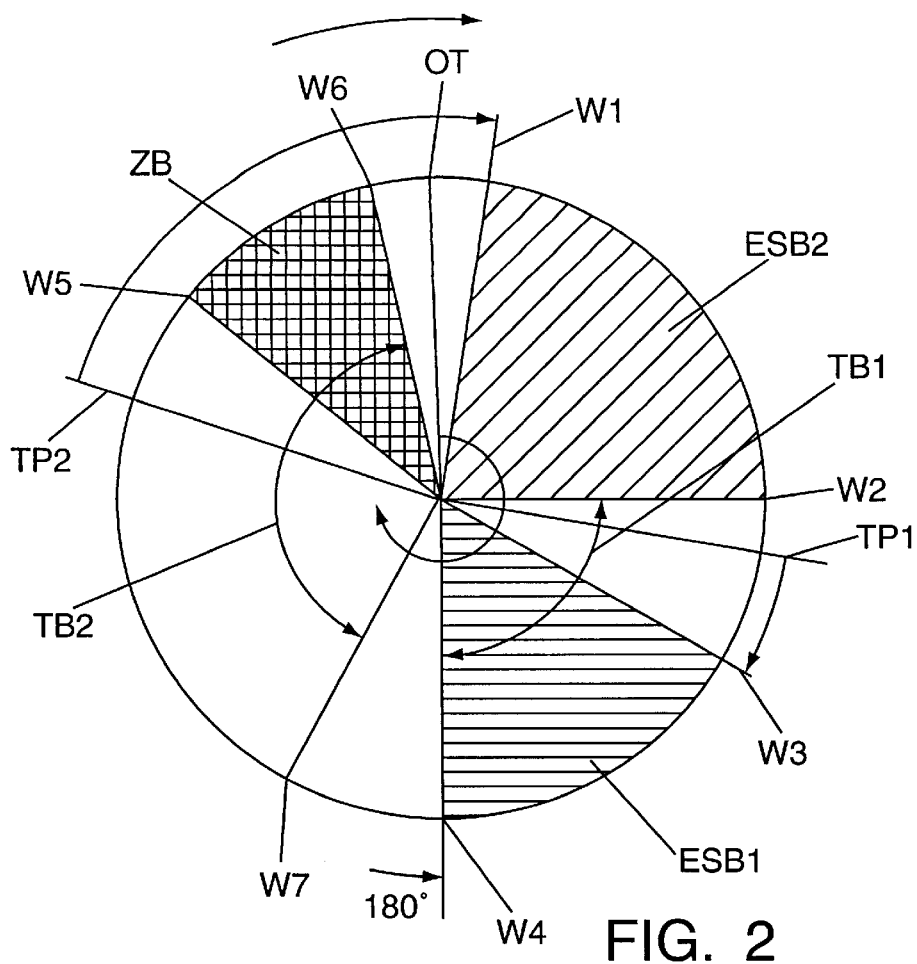
FIG. 2 shows a diagram corresponding to FIG. 1 with two trigger points according to the invention.

In FIG. 2 the changes become apparent which result by the invention in an angle diagram according to the FIG. 1. One sets out once again from two ranges ((ESB1 and ESB2) of the injection start which extend from the angle W4 (180° KW) through W4 (240° KW) and from angle W2 (270° KW)through W1 (350° KW) before the top dead center. In addition to the first trigger point (TP1), which may be located within a first trigger range (TB1) of W4 through W1, a second trigger point (TP2) is now provided which may be located within a second trigger range (TB2) between W6 and W7. In this case, W6 is approximately 10° KW before the top dead center. If, setting out from the idling, the revs/min of the engine are increased, the injection control is, from a certain threshold number of revolutions from the first triggering point (TP1) within the first trigger range (TB1) changed over to the second trigger point (TP2) within the second trigger range (TB2). The angular divergence between trigger point and injection start is shortened thereby, whereby the influence of engine speed fluctuations on the injection control is minimized.

Figure 3:
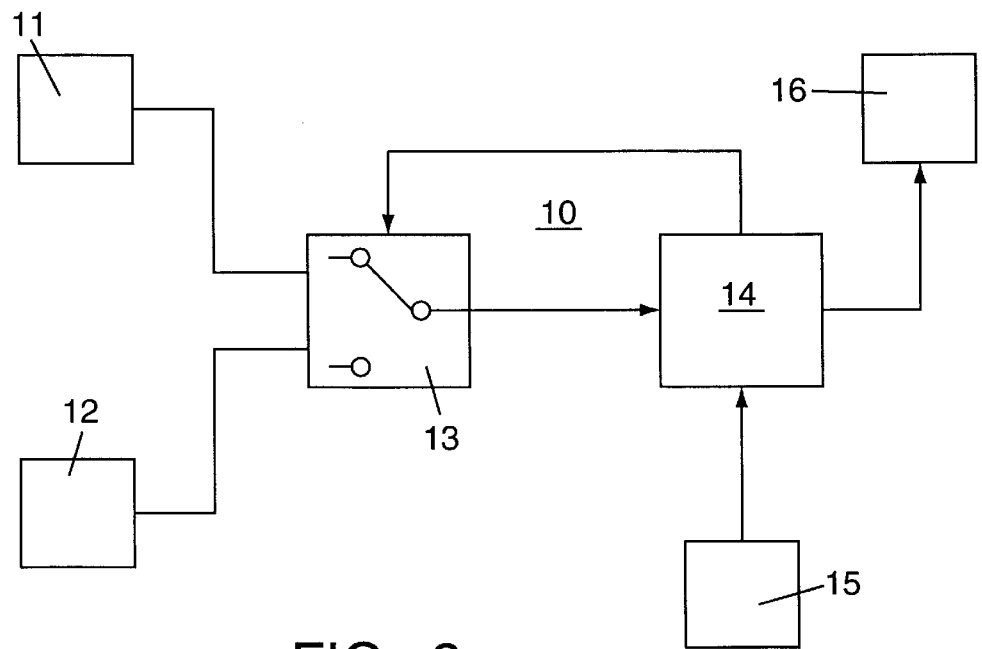
FIG. 3 shows, in a block diagram, an exemplary control for performing the method according to the invention.

A simple embodiment example of a control means for performing the method is schematically depicted in FIG. 3.

The control means 10 comprises a central control section (with microprocessor or the like) which, via a controlled change-over switch 13, optionally receives trigger signals for controlling the injection start from two trigger signal transmitters 11 or 12. The first trigger signal transmitter 11 is in this case allocated to the first trigger point (TP1), the second trigger signal transmitter 11 is allocated to the second trigger point (TP2). The control section is in principle capable od deriving the engine speed information necessary for the changing over from the sequence of the trigger signals. However, in many cases it will be expedient to make provision for a separate engine speed transmitter 15, which transmits the engine speed values to the control section 14. The output of the control secion 14 is connected with the injection valve 16, whose opening start and opening duration can be controlled.

The first trigger signal transmitter 11 can be a Hall transmitter or a similar crank angke sensor which is placed at a pertinent point on the engine. The second trigger signal transmitter 12 could, with engines equipped with magnet wheel/fan wheel and integral magnet for controlling the ignition, be this magnet itself. In other engine configurations this task could likewise be assumed by a further Hll transmitter.

This econd trigger signal transmitter 12 or trigger point (TP2) should—as already mentioned—be located within an angle range of approximately 10–150° KW before the top dead center. In standard high-speed two-stroke internal combustion engines, as are also made use of in manual operation equipment produced by the applicants, the ignition magnet is, in the form of a trigger signal transmitter, located approximately 20° KW before the top dead center (OT). Consequently, an overlapping of computtation time/ injection duration/trigger point is avoided. With this. for each engine revolution, in dependence of load and engine speed range, an optimal injection start in connection with the necessary injection duration is ensured.

Altogether, with the invention, a method and a device for controlling high-speed two-stroke internal combustion engines with fuel injection are obtained which guarantee that the internal combustion engine possesses, within the entire engine speed range, an optimal operational behavior manifesting itself in performance running, in pollutant emission as well as in a uniform running of the engine.

| | |
|---|---|
| Control system | 10 |
| trigger signal transmitter | 11, 12 |
| change-over switch | 13 |
| control section | 14 |
| engine speed transmitter | 15 |
| injection valve | 16 |
| injection start range | ESB1, ESB2 |
| top dead center | OT |
| trigger range | TB |
| trigger ranges | TB1, TB2 |
| trigger point | TP |
| trigger points | TP1, TP2 |
| ignition range | ZB |
| angles | W1–W7. |

We claim:

1. Method for controlling an injection valve (16) in a high-speed two-stroke internal combustion engine with fuel injection, characterized in that, with each engine revolution, a trigger signal is generated at a trigger point (TP) and, according to the trigger signal, the injection operation is initiated, in which case, for low engine speeds, the injection start is within a first range (ESB1) of the crankshaft angle of rotation in that for high engine speeds, the injection start is within a second range (ESB2) of the crankshaft angle of rotation, which second range (ESB2), in comparison with the first range (ESB1), is displaced in the direction "early" relative to the top dead center (OT), and in that, to each of the two ranges (ESB1 or ESB2), a trigger point of its own (TP1 or TP2) is allocated, and in that, when changing between low and high engine speeds, starting from a predetermined threshold engine speed, a changeover of the control between the two trigger points (TP1, TP2) takes place.

2. Method according to claim 1, characterized in that the two trigger points (TP1 or TP2) each are within trigger range (TB1 or TB2), which, in relation to the crankshaft angle of rotation, is close to the associated injection range (ESB1 or ESB2).

3. Method according to claim 2, characterized in that the first range (ESB1) is located within approximately 180–240° KW before the top dead center (OT) of the engine, in that the second range (ESB2) is located within approximately 270–350° KW before the top dead center (OT), in that the first trigger range (TB1) is located within approximately 180–250° KW before the top dead center (OT) and in that the second trigger range (TB2) is located approximately 10–150° KW before the top dead center (OT).

4. Method according to claim 3, characterized in that
the ignition of the engine with the aid of a magneto takes place more than 10° KW, more particularly approximately 20° KW, before the top dead center (OT), and in that the ignition signal emitted by the magneto or a signal emitted by some other sensor is used as trigger signal for the second injection range (ESB2).

5. Method according to claim 1, characterized in that,
for the generation of one or both trigger signals, Hall transmitters or crank angle transmitters, more particularly incremental transmitters, are employed.

6. Device for performing the method according to claim 1, characterized in that
the device (10) comprises a control section which, with the aid of a change-over switch (13) controlled by the control section (14), is optionally connectable with one of the two trigger signal transmitters (11, 12) and in that an output of the control section (14) is operatively connected with the injection valve (16).

7. Device according to claim 6, characterized in that
an engine speed transmitter (15) is provided which is in connection with the control section (14).

8. Device according to claim 6, characterized in that
the internal combustion engine comprises an ingnition magneto and in that the ignition magneto at the same time forms part of one of the two trigger signal transmitters (11, 12).

9. Device according to claim 6, characterized in that
the control section (14) comprises a computer, which computes the injection start from the trigger signal and possibly from the engine speed.

* * * * *